US00RE33817E

United States Patent [19]

Tyler

[11] E Patent Number: Re. 33,817

[45] Reissued Date of Patent: Feb. 11, 1992

[54] APPARATUS FOR FOLDING AN OUTBOARD BOOM ON A LIQUID SPRAYING IMPLEMENT

[75] Inventor: Loren E. Tyler, Loomington, Ill.

[73] Assignee: Lor-al, Inc., Benson, Minn.

[21] Appl. No.: 381,589

[22] Filed: Jul. 13, 1989

Related U.S. Patent Documents

Reissue of:

[64] Patent No.: 4,449,667
Issued: May 22, 1984
Appl. No.: 371,817
Filed: Apr. 26, 1982

[51] Int. Cl.[5] ..... B05B 1/20

[52] U.S. Cl. ..... 239/167; 239/169; 239/170

[58] Field of Search ..... 239/167, 166, 164, 159

[56] References Cited

U.S. PATENT DOCUMENTS

| | | | |
|---|---|---|---|
| 24,256 | 5/1859 | Wolff . | |
| 444,143 | 1/1891 | Street . | |
| 896,995 | 8/1908 | Kates . | |
| 1,427,450 | 8/1922 | Ewald . | |
| 1,596,755 | 8/1926 | Muller . | |
| 1,622,163 | 3/1927 | Niederhauser . | |
| 1,709,245 | 4/1929 | Adams . | |
| 2,330,568 | 9/1943 | Erickson . | |
| 2,781,229 | 2/1957 | Thornburg . | |
| 3,044,712 | 7/1962 | Tanke . | |
| 3,117,725 | 1/1964 | Palmer . | |
| 3,425,628 | 2/1969 | Reams . | |
| 3,581,993 | 6/1971 | Reams . | |
| 4,039,147 | 8/1977 | Hugg | 239/167 |
| 4,116,138 | 9/1978 | McFarland et al. | 111/7 |
| 4,320,805 | 3/1982 | Winter | 172/770 |

FOREIGN PATENT DOCUMENTS

| | | |
|---|---|---|
| 1482373 | 11/1964 | Fed. Rep. of Germany . |
| 1482366 | 6/1969 | Fed. Rep. of Germany . |
| 2111420 | 9/1972 | Fed. Rep. of Germany . |

OTHER PUBLICATIONS

Landmaschinen-Rundschau, 3/1977, pp. 67–68.
Landmaschinen-Rundschau, Agrartechnik Report, vol. 31, No. 2, Mar. 1979, pp. 48 and 78.
Landtechnik 12, Dec. 1978, p. 558.
Landmaschinen-Rundschau, 1/1977, p. 9.
Landtechnik 3, Mar. 1979, pp. 128–132.
Report of R. Barry Rogers, P. Eng.
Brochure of Allaeys SA., "Self-Propelled Spray Rig", four pages, 1974, published in Belgium.

*Primary Examiner*—Andres Kashnikow
*Assistant Examiner*—Kevin P. Weldon
*Attorney, Agent, or Firm*—Merchant, Gould, Smith, Edell, Welter & Schmidt

[57] ABSTRACT

An apparatus for folding an outboard boom on a liquid spraying element is disclosed. The apparatus (20) both folds a portion of the boom (14) while simultaneously operating a valve device (22) controlling liquid ejection device (78) mounted on the folded portion (18) of the boom (14). In this fashion, boom (14) has an operational capability at both a longer and a shorter span width.

4 Claims, 2 Drawing Sheets

APPARATUS FOR FOLDING AN OUTBOARD BOOM ON A LIQUID SPRAYING IMPLEMENT

Matter enclosed in heavy brackets [ ] appears in the original patent but forms no part of this reissue specification; matter printed in italics indicates the additions made by reissue.

TECHNICAL FIELD

This invention relates to the field of liquid spray implements, primarily for agricultural use. The present apparatus both folds a portion of a boom while simultaneously operating a valve device controlling liquid ejection devices mounted on the folded portion of the boom.

BACKGROUND OF THE INVENTION

Chemicals and fertilizers are commonly applied to agricultural crops. Applicator implements for liquid chemicals and fertilizers commonly include a vehicle, usually self propelled, with a tank and a plurality of spray or ejection nozzles in fluid communication with the tank. Often, the nozzles are supported on a boom structure which extends perpendicularly outward on both sides of the implement. With the advent of my no-bounce positioning boom apparatus disclosed in U.S. patent application Ser. No. 160,677 filed June 18, 1980, boom lengths have almost doubled. As a consequence, situations are encountered wherein it would be advantageous to have a shorter boom, such as, the last swath along a field edge. Additionally, the super long booms are difficult to maneuver in a farm yard or to drive on a road. Since booms have heretofore been substantially shorter, however, there seems to be little applicable art with respect to making a boom shorter while at the same time retaining the capability of keeping it functional at the shorter length.

As a baseline, it is recognized that Chemical applicator implements are known to include cooperating booms extending perpendicularly outwardly from the sides of a tank-truck at the rear end thereof. Articulated booms having neither horizontal or vertical axis are known. These presently known folding booms, however, are intended primarily to make the boom more compact for transport. As indicated, it has been unnecessary, until the advent of the super-long booms, to provide a folding capability for the outer portion of the boom while keeping the inner portion of the boom extended and operational for chemical delivery.

SUMMARY OF THE INVENTION

The present invention is directed to an apparatus for folding an outboard portion of a boom with respect to an inboard portion and controlling substance flow to ejection nozzles supported thereon. The apparatus includes an extendable actuator having a first end attached to the inboard portion of the boom. The apparatus further includes a valve attached to the inboard portion of the boom wherein the valve is connected between a source container and ejection nozzles on the outboard portion of the boom. The apparatus also includes linkage mechanism for connecting the actuator with the outboard portion of the boom and also with the valve. The linkage mechanism allows the actuator both to fold the outboard portion of the boom relative to the inboard portion and to operate the valve. In this fashion, the valve is closed as the outboard portion is folded with respect to the inboard portion thereby preventing substance from flowing to ejection devices along the folded outdoor portion of the boom when the outboard portion is in the folded configuration.

In one embodiment, the linkage mechanism includes a lever pivotably attached to the inboard portion of the boom at a fixed pivot location. The lever defines first and second movable pivot points at its opposite ends. The lever is attached at the first movable pivot point to the second end of the actuator, and the lever is connected at the second movable pivot point through a linkage arm to the valve. A second linkage arm is pivotably attached at its ends between the lever at the first movable pivot point and the outboard portion of the boom at a location spaced apart from a hinge axis common to the outboard and inboard portions of the boom. When the hinge axis and the various pivot axes are substantially horizontal with the ground, the outboard portion of the boom may be folded upwardly to rest adjacent to and on the top of the inboard portion of the boom. The outboard portion is thereby stored in a location which does not interfere with the functioning of the inboard portion with its ejection devices supported thereon.

The present apparatus is particularly advantageous since upon folding the outboard portion of the boom, the linkage mechanism causes operation of the valve so as to close off chemical flow from the container to the ejection devices mounted on the outboard portion of the boom. A flexible hose connects solid piping leading to the ejection devices on the inboard and outboard portions of the boom. The flexible hose maintains plumbing integrity while allowing the outboard portion of the boom to fold.

A further advantageous feature of the present apparatus is realized when a ganged valve is operated by the linkage mechanism. One of the ganged valves is connected into the plumbing which directs chemical to the ejection devices; the other ganged valve is connected into tubing which contains flowing foam for marking the outer edge of the spray. With the outboard portion of the boom extended, foam flows to an outermost output. With the outboard portion of the boom folded, the ganged valve prevents foam from flowing to the outboard portion and allows the foam to be outputted at the outer end of the inboard portion of the boom.

These advantages and other objects obtained by the use of the present invention may be better understood by reference to the drawings which form a further part of this disclosure and to the accompanying descriptive matter in which there is illustrated and described in more detail a preferred embodiment of the invention.

A BRIEF DESCRIPTION OF THE DRAWINGS

DETAILED DESCRIPTION OF THE INVENTION

Figure 1:
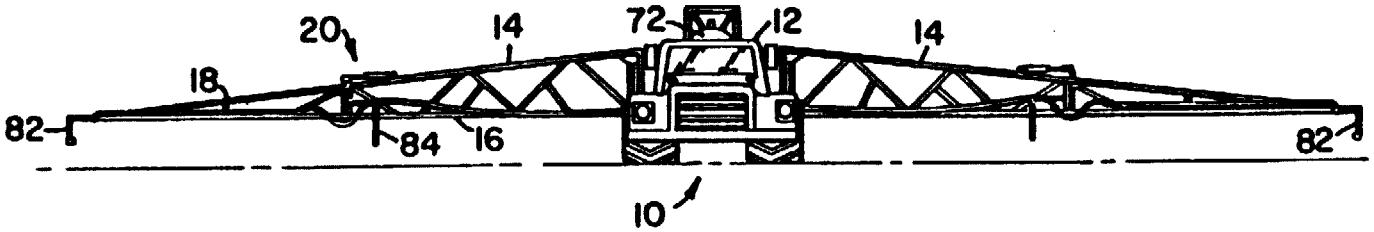
FIG. 1 is a front view of a chemical applicator implement having a boom and an apparatus for folding the boom in accordance with the present invention.

Referring now to the drawings wherein like reference numerals designate identical or corresponding parts throughout the several views, and more particularly to FIG. 1, an applicator implement, an apparatus on which the present invention may commonly be used, is designated generally as 10. Implement 10 commonly includes a vehicle 12 having a pair of booms 14 extending outwardly from the rearward end of the sides. Each boom 14 has an inboard portion 16 and an outboard portion 18. An apparatus 20 is shown for folding the outboard portion 18 with respect to the inboard portion 16.

Figure 2:
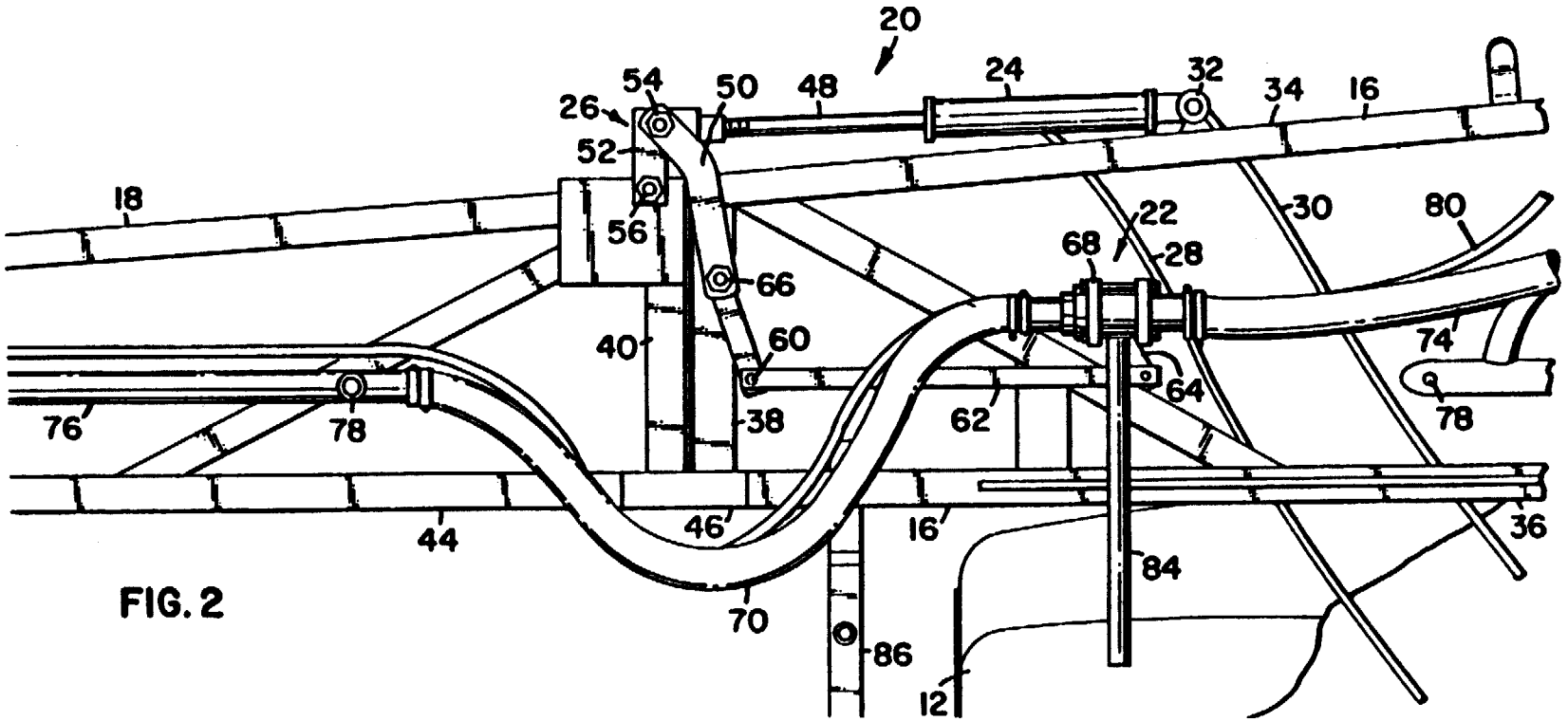
FIG. 2 is a side elevational view showing the outboard portion of the boom extended.
Figure 3:
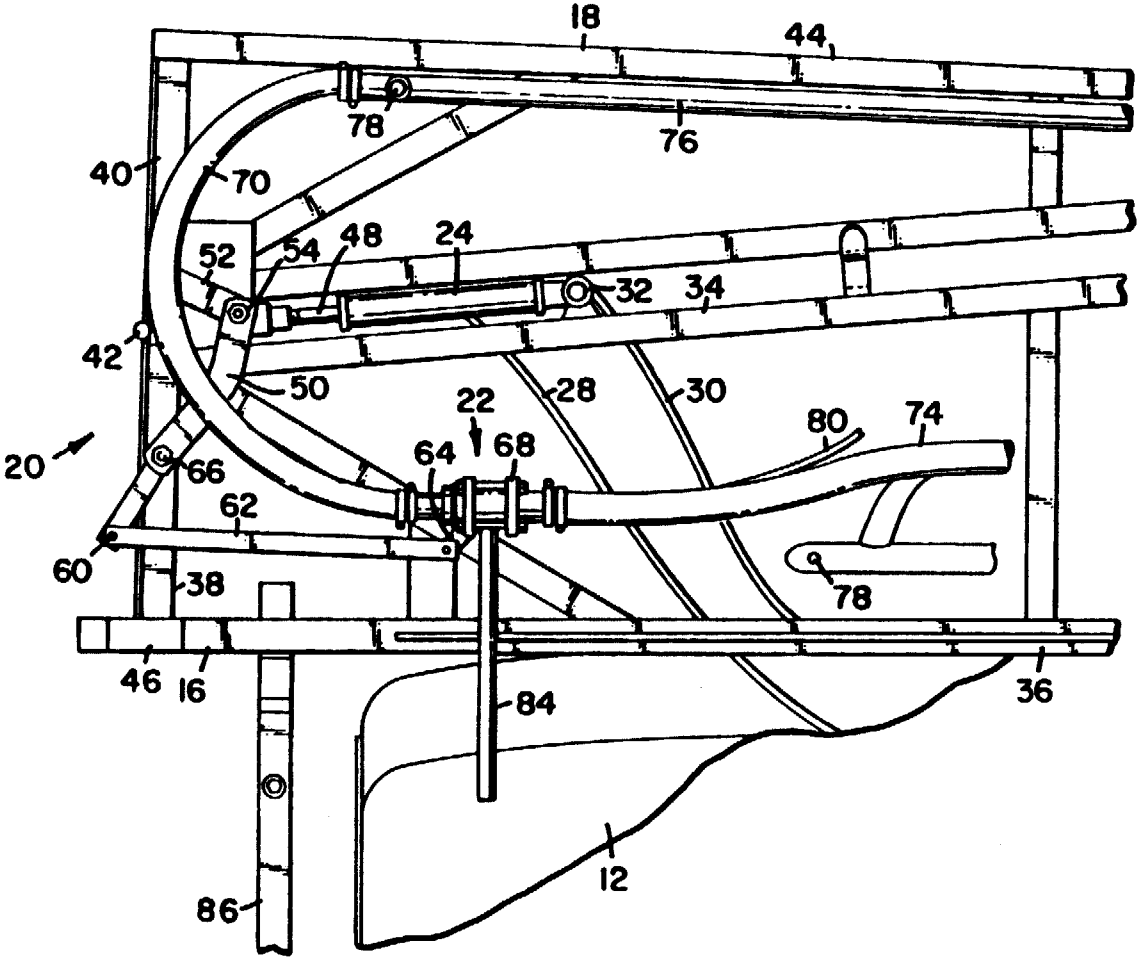
FIG. 3 is a side elevational view similar to FIG. 2 except the outboard portion of the boom is folded.

As shown in FIGS. 2 and 3, apparatus 20 both folds outboard portion 18 with respect to inboard portion 16 and operates a set of ganged valves 22 to open and close plumbing carrying liquid chemical to ejection devices mounted on outboard portion 18 and marking foam to output 78 tubes. In addition to ganged valve mechanism 22, apparatus 20 is comprised of an actuating mechanism 24 and a linkage mechanism 26. Actuating mechanism 24 is preferably an hydraulic cylinder having lines 28 and 30 leading through various valve mechanisms to a reservoir, all not shown and part of an hydraulic system of a type commonly known. Actuating mechanism 24 may be, however, an air or other gas operated cylinder, an extensible screw, an electric motor for driving a linear arm or other devices commonly known and used by those skilled in the art for applications like that of the present invention. The hydraulic cylinder 24 is pivotably attached at connection 32 on upper stringer 34 of the inboard portion 16 of boom 18. Connection 32 is made with a pin to a bracket or such other fastening mechanism as may be applicable.

Upper stringer 34 and lower stringer 36 are separated by a number of vertical and diagonal members as seen in FIG. 1. The outermost vertical member 38 of inboard portion 16 of boom 14 abuts the innermost vertical member 40 of outboard portion 18 when boom 14 is fully extended. As shown in FIG. 3, the inboard and outboard portions 16 and 18 of boom 14 are pivotably connected together at hinge 42 such that the hinge axis is somewhat above stringer 34. When outboard portion 18 is in an extended position, the intersection of vertical member 40 and a lower stringer 44 is received between a pair of guide plates 46 fastened to either side of lower stringer 36 of inboard portion 16.

The extensible end 48 of actuator 24 is pivotably connected to a lever 50 and a linkage arm 52 with a nut and bolt or other suitable pivotable connection 54. The second end of linkage arm 52 is pivotably connected with a nut and bolt or other suitable connection 56 throughout a pair of structural plates 58 fastened on either side of outboard portion 18 at its inner and uppermost corner. Pivotable connection 56 is spaced outwardly from the axis of hinge 42.

The lower end of lever 50 is pivotably connected with a suitable connection 60 to linkage arm 62 pivotably connected at its other end to handle 64 of ganged valves 22. Between its ends, lever 50 is pivotably attached at a fixed location to vertical member 38 with a suitable connection 66.

The geometry of linkage mechanism 26 allows extensible end 48 of actuator 24 to move back and forth in approximately a straight line. Similarly, linkage arm 62 connecting lever 50 and handle 64 of ganged valves 22 moves approximately parallel to extensible end 48. The distance between fixed pivotable connection 66 and pivotable connection 60 is approximately one-third of the length of lever 50, leaving about two-thirds of its length between pivotable connection 54 and fixed pivotable connection 66. Linkage arm 52 is of suitable length to allow pivotable connection 54 to be approximately above pivotable connection 56 when outer portion 18 of boom 14 is extended. Lever 50 may be comprised of more than one piece in order to allow adjustment of the geometry to a workable configuration.

Ganged valves 22 are held together in a framework 68. Framework 68 is essentially a clamping mechanism for holding two valves together such that a single handle 64, or a pair of handles fastened together, may be connected to the shafts of the valves so as to operate both at the same time. One of ganged valves 22 is connected into a flexible hose 70 which is in fluid communication with a source container, such as 72 in FIG. 1. Inboard and outboard portions 16 and 18 of boom 14 support non-flexible tubing 74 and 76 to which the ends of flexible tubing 70 are connected. The non-flexible tubing provides for ejection devices 78 from which liquid chemical or fertilizer is sprayed onto the ground.

The second of ganged valves 22 is connected into a flexible line 80 for containing a foam substance to mark the edges of a swath. With outboard portion 18 of boom 14 extended, the foam substance flows through flexible tube 80 to output end 82 at the outermost end of extended outboard portion 18. With outboard portion 18 folded, the foam substance flows from output end 84 hanging beneath ganged valves 22.

To operate, the booms 14 are lifted from cradles 86 and rotated outwardly from vehicle 12 in a fashion not important to the present invention. The booms are now in the configuration of FIG. 3, and if it is desired to use implement 10 with booms 14 having the shorter span, the system may be turned on and chemical or other liquid will be ejected from the fluid ejectors mounted from inner portions 16 of booms 14 and marking foam will flow from outputs 84. If, however, it is desired to use the boom in its longer span configuration as illustrated in FIG. 1, then apparatus 20 is operated. Actuator 24 is extended causing the axis at connection 54 to move thereby rotating linkage arm 52 and lever 50. Movement of linkage arm 52 forces outboard portion 18 to rotate about the axis of hinge 42. Movement of lever 50 causes lever 50 to rotate about the axis of connection 66 *so the upper portion of lever 50 transfers the linear force of said actuator 24 into rotational movement of said outboard portion 18 with respect to said inboard portion 16 and* so the lower portion of lever 50 forces linkage arm 62 to move and operate handle 64 of ganged valves 22. As the actuator reaches the end of its stroke, handle 64 completely opens the valves in ganged valve assembly 22 and upon turning the system on, chemical flows to the ejectors 78 mounted on outboard portion 18 and marking foam flows to output 82 at the very end of outboard portion 18.

Outboard portion 18 is conveniently re-folded by operating the actuator 24 in reverse. Ganged valves 22 are closed and again the implement may be operated with the shorter span of operational boom represented by inboard portion 16. Outboard portions 18 are advantageously folded completely out of the way in the position above inboard portions 16, and chemical and foam is shut off at ganged valves 22 to make the outboard portions and devices mounted thereon completely non-operational. Additionally, the booms may be replaced in the configuration adjacent to vehicle 12 thereby allowing easy transport.

Thus, the present invention is advantageous not only for transport of very long booms, but also for providing the operational option of using either a long or a short boom.

Although, however, these characteristics and advantages of the present apparatus, together with details of structure and function, have been described in detail, it is to be understood that the above disclosure is illustrative only. Consequently, any changes made, especially in matters of shape, size and arrangement, to the full extent extended by the general meaning of the terms in which the appending claims are expressed, are within the principal of the invention.

What is claimed is:

1. Apparatus for folding an outboard portion of a boom and controlling substance flow to ejection devices supported thereon, said boom having also an inboard portion, said apparatus comprising:

hinge means for pivotably connecting the inboard and outboard portions of said boom;

a valve connected between a source container in fluid communication with said ejection devices and said ejection devices on the outboard portion of said boom, said valve having an actuating member;

means for moving the outboard portion of said boom about the pivoted axis of said hinge means and simultaneously moving said valve actuating member, said moving means being attached [directly] to [one of] said inboard [and outboard portions] *portion*;

linkage means for connecting said moving means, *said valve* and [the other of said inboard and] *said* outboard [portions] *portion*, said linkage means forming a common axis with a first element connected to [said other of] said [inboard and] outboard [portions] *portion* and a second element connected to said valve, said moving means moving said outboard portion and said valve actuating member simultaneously by moving said common axis.

2. Apparatus for pivotably folding an outboard portion of a boom with respect to an inboard portion and controlling substance flow to ejection devices supported thereon, said apparatus comprising:

a valve connected between a source container in fluid communication with said ejection devices on the inboard portion of said boom and said ejection devices on the outboard portion of said boom;

actuator means, attached to said inboard portion, for providing a linear force;

means for linking said actuator means to said outboard portions; and means for transferring the linear force of said actuator means into rotational movement of said outboard portion with respect to said inboard portion; said transferring means including a lever attached to said inboard portion at a location between first and second ends, said first end being attached to one of said linking means and said actuator means, said second end being connected to said valve;

whereby operation of said actuator means causes through said transferring means and said linking means both operation of said valve and rotational movement of said outboard portion.

[3. An apparatus in accordance with claim 2 wherein said linking means includes an arm pivotally attached between said outboard portion and one of said lever and said actuator means, the attachment between said arm and said outboard portion being spaced apart from the pivotal axis of said outboard portion with respect to said inboard portion.]

4. An apparatus in accordance with claim [3] *2* wherein *said linking means includes an arm and said outboard portion rotates about a pivotal axis with respect to said inboard portion*, said actuator means, said lever and said arm [are] *being* rotatably attached along a common axis *spaced apart from the pivotal axis*.

5. Apparatus for folding an outboard portion of a boom and controlling liquid flow to ejection devices supported thereon, said boom having also an inboard portion, said apparatus comprising:

an extendable power actuator having first and second ends, said first end being attached to the inboard portion of said boom;

a valve attached to the inboard portion of said boom, said valve being connected between a source container and said ejection devices on the outboard portion of said boom, said container being in fluid connection with said ejection devices through said valve and a tube supported by said boom; and linkage means for connecting said actuator with the outboard portion of said boom and also with said valve, said linkage means allowing said actuator both to fold the outboard portion of said boom relative to the inboard portion and to operate said valve; said linkage means including:

a lever pivotably attached to the inboard portion of said boom at a fixed pivot, said lever defining first and second movable pivots at its ends, said lever being attached at the first moveable pivot to the second end of said actuator;

a first arm pivotably attached at its ends between said lever at the first moveable pivot and a third moveable pivot, said third moveable pivot being on the outboard portion of said boom spaced apart from a hinge axis common to both the outboard and inboard portions of said boom; and a second arm pivotably attached at one end to said lever at the second moveable pivot and at another end to said valve.

* * * * *